US012592920B2

(12) United States Patent　　　　(10) Patent No.: US 12,592,920 B2
Brabble et al.　　　　　　　　　　　(45) Date of Patent: Mar. 31, 2026

(54) GRANULAR AUTHORIZATION FLOW IN A DISTRIBUTED, MULTI-DOMAIN COMPUTING SYSTEM

(71) Applicant: DISNEY ENTERPRISES, INC., Burbank, CA (US)

(72) Inventors: Kerry D. Brabble, Orlando, FL (US); Robert K. Floyd, III, Clermont, FL (US); Nicholas Jordan Lewis, Saint Cloud, FL (US)

(73) Assignee: DISNEY ENTERPRISES, INC., Burbank, CA (US)

( * ) Notice: Subject to any disclaimer, the term of this patent is extended or adjusted under 35 U.S.C. 154(b) by 112 days.

(21) Appl. No.: 18/422,608

(22) Filed: Jan. 25, 2024

(65) Prior Publication Data

US 2025/0247384 A1　　　Jul. 31, 2025

(51) Int. Cl.
　*H04L 9/40*　　　　　　(2022.01)
(52) U.S. Cl.
　CPC ............ *H04L 63/083* (2013.01); *H04L 63/20* (2013.01)
(58) Field of Classification Search
　CPC .............................. H04L 63/083; H04L 63/20
　See application file for complete search history.

(56) References Cited

U.S. PATENT DOCUMENTS 7,464,162 B2 *　12/2008　Chan ..................... G06F 21/604
　　　　　　　　　　　　　　　　　　　　　726/28
9,516,053 B1 *　12/2016　Muddu ................ G06V 10/225

| 10,467,050 | B1 | 11/2019 | Schmidgall et al. |
| 10,956,213 | B1 | 3/2021 | Chambers et al. |
| 12,169,802 | B1 | 12/2024 | Eldan et al. |
| 2005/0027585 | A1 | 2/2005 | Wodtke et al. |
| 2007/0240099 | A1 | 10/2007 | Jahn et al. |
| 2007/0250335 | A1 | 10/2007 | Hodges et al. |
| 2009/0171708 | A1 | 7/2009 | Bobak et al. |
| 2009/0204471 | A1 | 8/2009 | Elenbaas et al. |
| 2010/0324948 | A1 | 12/2010 | Kumar et al. |
| 2016/0072814 | A1 * | 3/2016 | Martinelli ............. G06F 21/604 726/1 |
| 2016/0162478 | A1 | 6/2016 | Blassin et al. |
| 2021/0117557 | A1 * | 4/2021 | Al-Shanqity ....... H04L 63/0892 |
| 2022/0083936 | A1 | 3/2022 | Balinsky et al. |

(Continued)

OTHER PUBLICATIONS

Non-Final Office Action received for U.S. Appl. No. 18/476,171 dated May 21, 2025, 16 pages.

(Continued)

*Primary Examiner* — SM A Rahman
(74) *Attorney, Agent, or Firm* — Squire Patton Boggs LLP; Sarah Mirza

(57)　　　　　　　ABSTRACT

The present invention sets forth a technique for automatically managing access control authorization in a distributed computing system. This technique includes receiving an access request from a requesting entity and recording the access request in an audit log. The technique also includes retrieving access control policies associated with the access request and retrieving attribute data values from an entity data store. The technique further includes generating an access request evaluation based on the access request, the access control policies, and the attribute data values. The technique further includes transmitting the access request evaluation to the requesting entity.

20 Claims, 4 Drawing Sheets

(56) References Cited

U.S. PATENT DOCUMENTS

| | | | | |
|---|---|---|---|---|
| 2022/0239733 | A1* | 7/2022 | Maheshwari | ........... H04L 63/20 |
| 2023/0179634 | A1* | 6/2023 | Seaborn | ................. H04L 63/10 |
| | | | | 726/1 |
| 2024/0169438 | A1 | 5/2024 | Biesack | |
| 2024/0184632 | A1 | 6/2024 | You et al. | |

OTHER PUBLICATIONS

Final Rejection received for U.S. Appl. No. 18/476,171, dated Dec. 2, 2025, 32 pages.

* cited by examiner

100

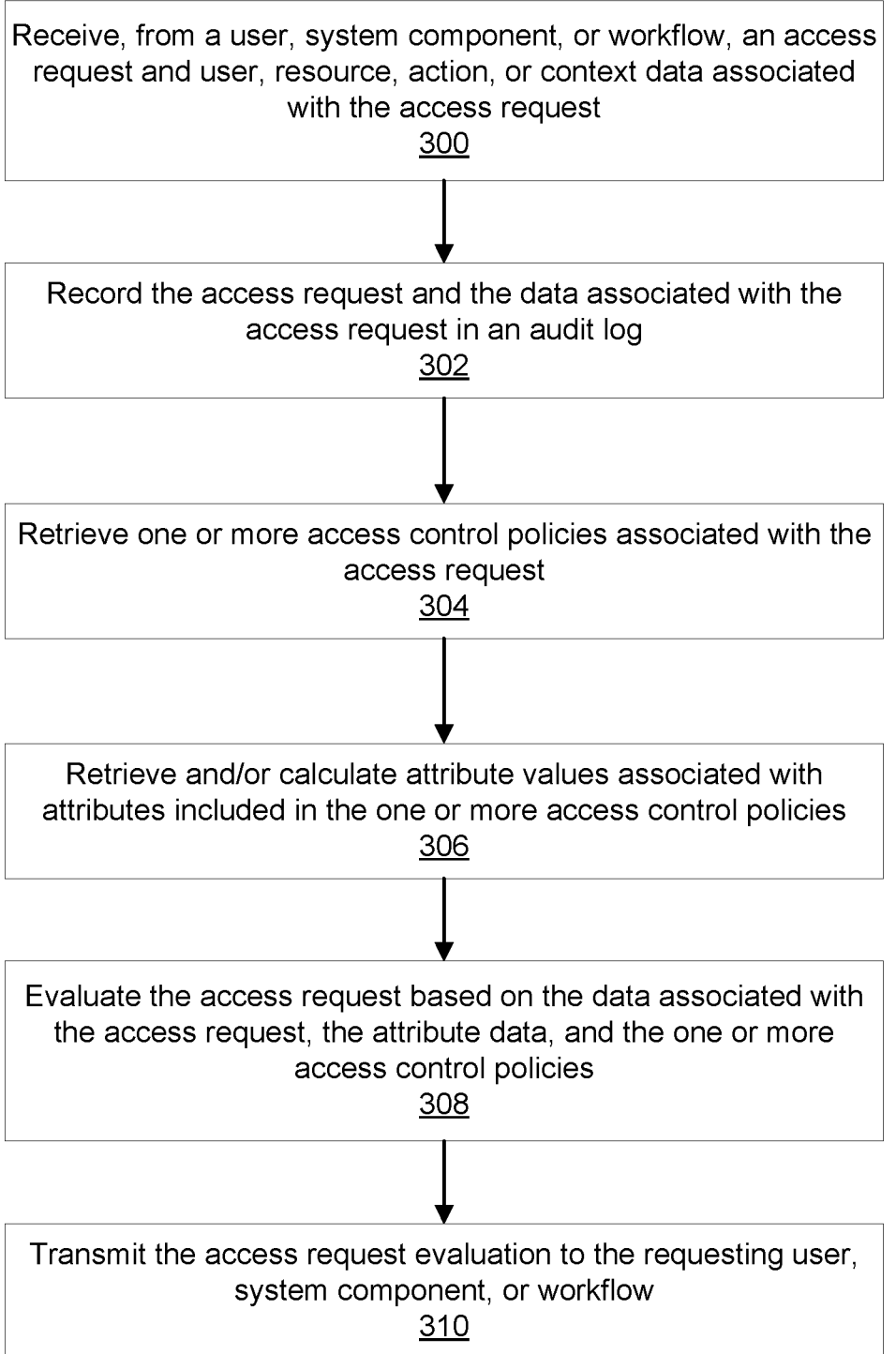

Receive, from a user, system component, or workflow, an access request and user, resource, action, or context data associated with the access request
300

Record the access request and the data associated with the access request in an audit log
302

Retrieve one or more access control policies associated with the access request
304

Retrieve and/or calculate attribute values associated with attributes included in the one or more access control policies
306

Evaluate the access request based on the data associated with the access request, the attribute data, and the one or more access control policies
308

Transmit the access request evaluation to the requesting user, system component, or workflow
310

FIG. 3

GRANULAR AUTHORIZATION FLOW IN A DISTRIBUTED, MULTI-DOMAIN COMPUTING SYSTEM

BACKGROUND

Field of the Various Embodiments

Embodiments of the present disclosure relate generally to Information Technology (IT) automation and, more specifically, to techniques for automatically managing access control authorization in disparate computer systems and software applications.

Description of the Related Art

Distributed, multi-domain computing systems experience significant risk of data breaches and other compromises. These compromises may be malicious or inadvertent, and the risk is exacerbated by the complexity of the computing systems, the large number of users in a distributed, multi-domain system, and the wide variety of disparate software applications resident in a computing system. Preventing excessive access in digital systems significantly mitigates the risk of data breaches and compromises for those systems and the sensitive data that they process. The concept of "least privilege," that a person or system should only have the minimum access needed to perform their duties, is one strategy for preventing excessive access in a computing system.

Applying least privilege in a complex, multi-domain system that hosts thousands of unique use cases, each with different access requirements and granular conditions, is challenging. Each user's need for access may vary widely and be based on domain-specific concepts such as the details of a particular request, a location or time associated with a particular request, or other contextual factors. Providing the correct level of access for a particular user under specific circumstances without unnecessarily exposing system resources requires a flexible and robust feature set.

Existing access control techniques may define several fixed levels of privilege and assign these levels to broad roles such as "Guests," "Users," and "Administrators." Assigning one of several fixed levels of privilege simplifies access management but severely limits the granularity of assigned rights and privileges. A user with a legitimate need for elevated privileges within a limited portion of a distributed computing system may be given unnecessary access to the entire computing system, simply because there is no available lower privilege level that allows the user to perform their assigned duties. These broad role-based systems encourage the granting of excessive access because they do not offer the granular permissions necessary to implement a least-access strategy.

Other existing access control techniques allow for granular access controls, but require that the access controls be locally configured, implemented, and maintained at the individual system, component, or application level. A multi-domain computing system may include hundreds or even thousands of individual domains, components, and applications, as well as necessary boundary interfaces between disparate elements within the computing system. Fully decentralized access control poses a security risk in a multi-domain computing system because each separate implementation of access control logic within the computing system represents a potential point of failure, either as a result of malicious intrusion or improper configuration of the access control logic. By its nature, decentralized configuration of access control policies also complicates the centralized administration, validation, and monitoring of access control measures.

As the foregoing illustrates, what is needed in the art are more effective techniques for automatically managing authorization and access control in disparate computer systems and software applications.

SUMMARY

In one embodiment, a computer-implemented method for performing authorization flow includes receiving an access request from a requesting entity in a distributed computing system, retrieving one or more access control policies associated with the access request, retrieving, from an entity data store, attribute values for one or more attributes included in the one or more access control policies, generating, based on the attribute values and the one or more access control policies, an access request evaluation, and transmitting the access request evaluation to the requesting entity.

One technical advantage of the disclosed techniques relative to the prior art is that the techniques provide distributed enforcement of granular access control at the domain, component, or application level in a distributed, multi-domain computing system while maintaining centralized control over access control policies and authorization decisions. The techniques also provide centralized auditing and logging services, as well as a centralized data store of attributes associated with users, actions, resources, and contexts. These technical advantages provide one or more technological improvements over prior art approaches.

BRIEF DESCRIPTION OF THE DRAWINGS

So that the manner in which the above recited features of the various embodiments can be understood in detail, a more particular description of the inventive concepts, briefly summarized above, may be had by reference to various embodiments, some of which are illustrated in the appended drawings. It is to be noted, however, that the appended drawings illustrate only typical embodiments of the inventive concepts and are therefore not to be considered limiting of scope in any way, and that there are other equally effective embodiments.

FIG. 3 is a flow diagram of method steps for performing access control authorization, according to various embodiments.

DETAILED DESCRIPTION

In the following description, numerous specific details are set forth to provide a more thorough understanding of the various embodiments. However, it will be apparent to one skilled in the art that the inventive concepts may be practiced without one or more of these specific details.

Figure 1:
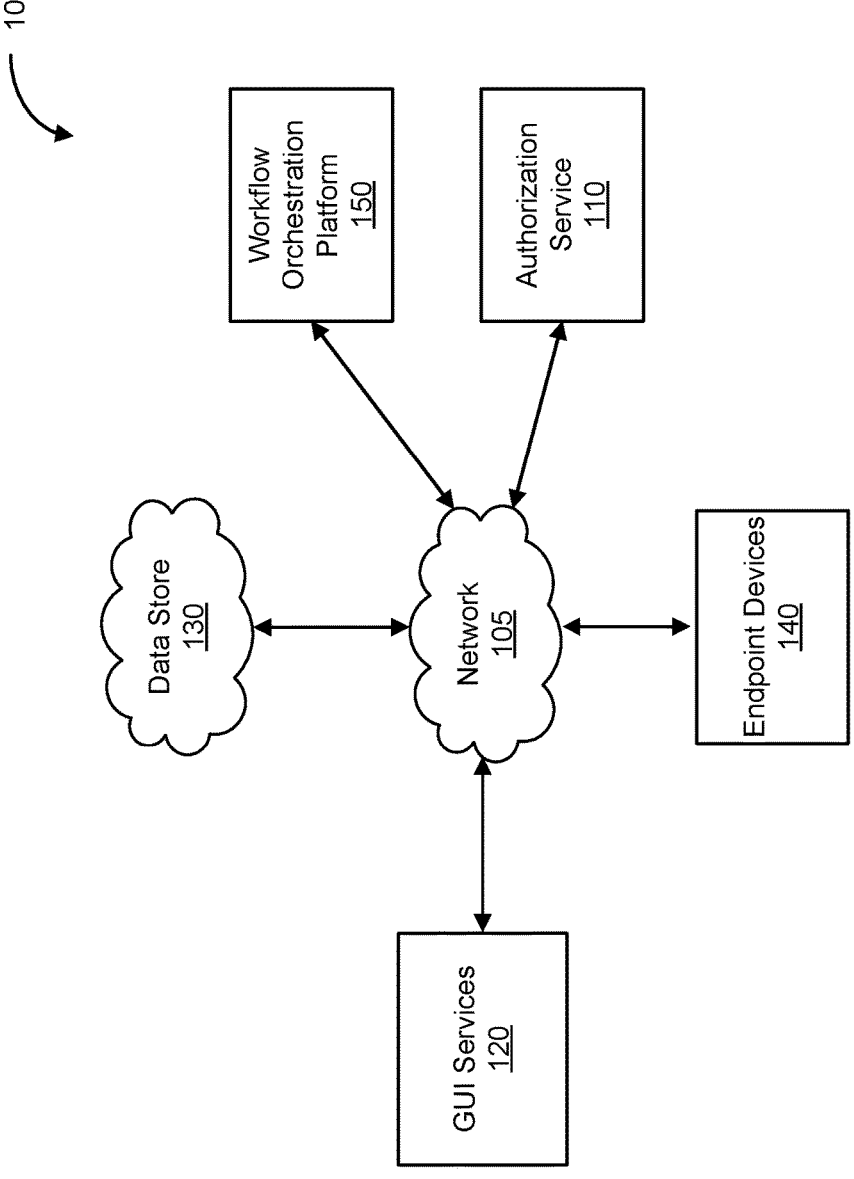
FIG. 1 illustrates an infrastructure 100 configured to implement one or more aspects of the various embodiments.

FIG. 1 illustrates an infrastructure 100 configured to implement one or more aspects of the various embodiments. As shown, infrastructure 100 includes an authorization service 110, one or more graphical user interface (GUI) services 120, a data store 130, a workflow orchestration platform 150, and one or more endpoint devices 140, which are connected to one another and/or data store 130 via a communications network 105.

Each endpoint device 140 communicates with data store 130, authorization service 110, and GUI services 120 via network 105 to transfer content, such as textual data, graphical data, configuration data, and other types of data. In various embodiments, endpoint devices 140 may include computer systems, software applications, or computer network devices implemented either virtually or in hardware.

Network 105 includes any technically feasible wired, optical, wireless, or hybrid network that transmits data between or among authorization service 110, data store 130, endpoint devices 140, GUI services 120, workflow orchestration platform 150, and/or other components. For example, network 105 could include a wide area network (WAN), local area network (LAN), personal area network (PAN), WiFi network, cellular network, Ethernet network, Bluetooth network, universal serial bus (USB) network, satellite network, and/or the Internet.

Authorization service 110 receives, records, and evaluates access requests from components of a multi-domain distributed computing system. Authorization service 110 evaluates the access requests based on access control policies and stored attribute data. Authorization service 110 is shown in more detail in FIG. 2

Workflow orchestration platform 150 coordinates, executes, and tracks the status of a variety of individual tasks necessary to successfully complete a user-requested workflow across a variety of disparate computer systems and components. In various embodiments, a workflow is a set of tasks that are completed to achieve a particular goal. For example, a workflow may contain a set of tasks that are executed to change configuration parameters in a remote network device. The tasks in a workflow may be grouped into one or more phases. Furthermore, a given task or phase in a workflow may have one or more dependencies on other tasks or phases in the workflow. For example, a dependency for a given phase may require that all tasks within a particular phase are complete before the tasks associated with that phase may be executed. A workflow may be user-requested or may be requested by other software platforms upstream from the workflow orchestration platform 150.

GUI services 120 provide an interface through which a user may initiate a workflow request, submit data associated with the workflow request, or view the status of a workflow request. GUI services 120 may display the overall status of a workflow request, as well as the status of individual phases or tasks included in the requested workflow. In various embodiments, GUI services 120 displays an Automation Marketplace that depicts a variety of available IT automation workflows and permits a user to select one or more automation workflows for execution.

In various embodiments, data store 130 may include file servers, hard disk drives, solid state storage devices, or similar storage devices. Data store 130 may also include an online storage service in which a catalog of files, including thousands or millions of files, is stored and accessed in order to exchange data with the various components in infrastructure 100. Although only a single instance of data store 130 is shown in FIG. 1, various embodiments of the present disclosure may implement multiple instances of data store 130.

Figure 2:
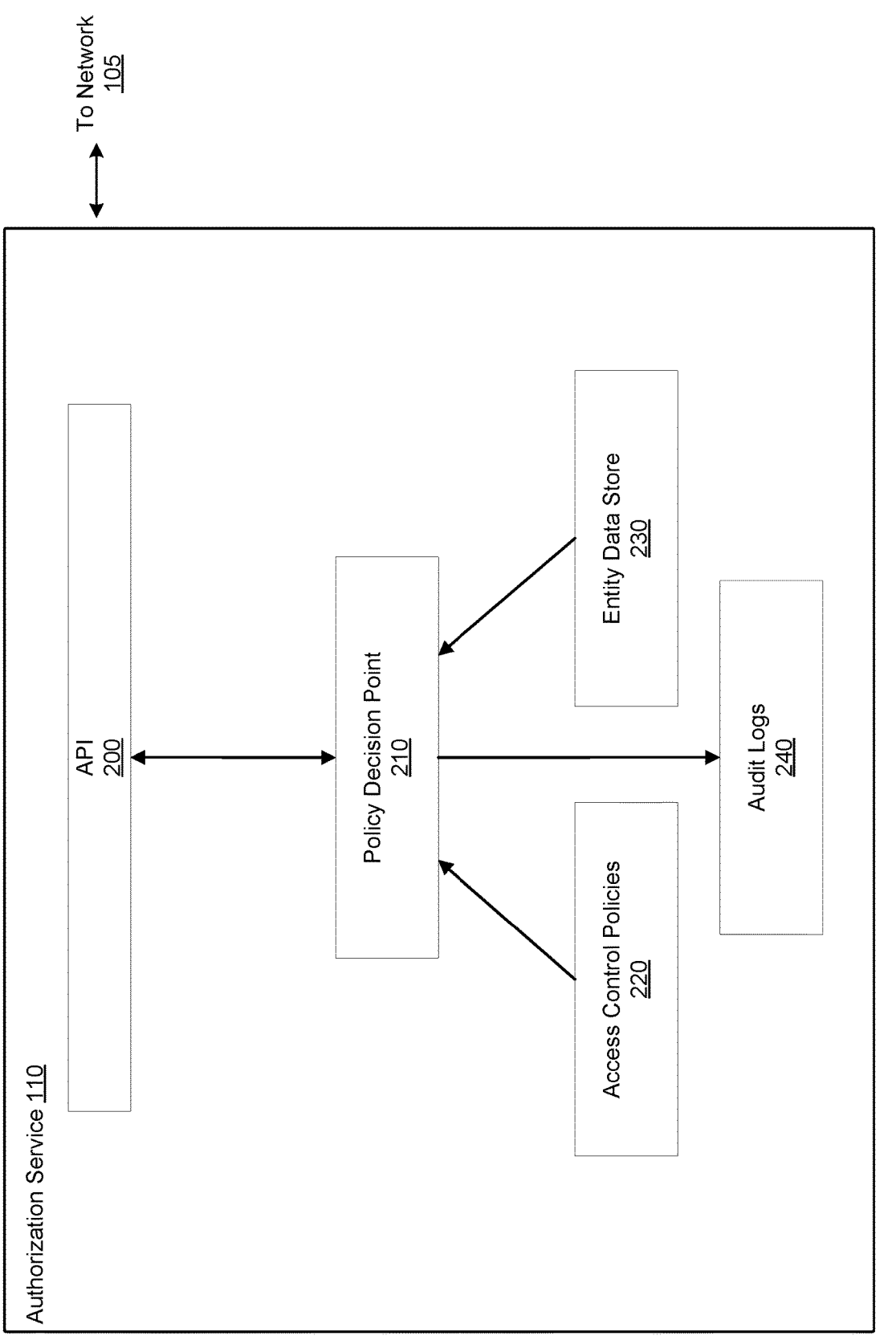
FIG. 2 is a more detailed illustration of authorization service 110 of FIG. 1, according to various embodiments.

FIG. 2 is a more detailed illustration of authorization service 110 of FIG. 1, according to some embodiments. Authorization service 110 receives, records, and evaluates access requests from components of a multi-domain distributed computing system. As shown in FIG. 2, authorization service 110 includes, without limitation, application program interface (API) 200, policy decision point 210, access control policies 220, entity data store 230, and audit logs 240.

API 200 within authorization service 110 receives externally generated user identity tokens via an API gateway (not shown). In various embodiments, the identity tokens include data associated with a user or upstream software application requesting access in a distributed computing system. Policy decision point 210 as discussed below transmits access request evaluations to users, computer systems, or workflows via API 200. API 200 provides standardized communication protocols for computer systems and software applications to extract and exchange data. API 200 includes endpoints for various computer systems, software applications, and IT automation workflows, and each of these endpoints provides an interface for its associated system, application, or workflow.

Access control policies 220 describe rules, conditions and attributes associated with components, actions, or workflows in a distributed computing system. The conditions and/or attributes associated with a particular component, action, or workflow must be satisfied before an access request is granted. Rules, conditions, or attributes may be associated with a requesting user or software application, a task to be performed, a resource to be utilized, or a domain-specific context within the distributed computing system. When evaluating an access request, policy decision point 210 retrieves one or more access control policies 220, as described below. Access control policies are expressed as human-readable computer code and stored in a software repository. Access control policies stored in the repository may be managed, tracked, modified, and shared.

Entity data store 230 includes data associated with the distributed computing system, as well as individual components, software applications, workflows and users within the distributed computing system. For example, entity data store 230 may include defined roles or authorization credentials for users of the computing system. Entity data store 230 may also include physical or geographical locations of one or more system components or pre-defined maintenance time periods for system domains and/or individual components.

Audit logs 240 include structured records of all access requests generated in the distributed computing system. As described below, policy decision point 210 generates one or more entries in audit logs 240 for each access request received and evaluated by policy decision point 210. Entries in audit logs 240 may include a time associated with an access request, as well as users, components, resources, or workflows associated with the access request. Individual fields or records within audit logs 240 may be sorted, filtered, or correlated. In various embodiments, audit logs 240 may be retained for any suitable period of time in a data storage such as data store 130 or system disk 406 discussed below. Authorization service 110 may retrieve and analyze the contents of audit logs 240 to generate audit log reports or perform statistical analysis such as trend detection across discrete microservices included in, e.g., workflow orchestration platform 150.

Policy decision point 210 receives and evaluates access requests from users or components within a distributed computing system, such as action engines. Action engines include one or more components that deploy (or propagate, perform, or execute) configuration changes associated with IT infrastructure components. Action engines may include computer systems, software applications, or computer infrastructure devices implemented either virtually or in hardware. Access control enforcement is distributed across each component of the distributed computing system so that access is controlled uniformly. Each component is aware of the unique details of domains that it processes and is responsible for providing that domain-specific knowledge as part of each access request, making the knowledge available as attribute values to be consumed by access policies. For example, an access request to execute an automated workflow to configure a network device may provide domain-specific attribute values associated with the network device, configuration details, commands to be executed, or a location of the network device.

Policy decision point 210 receives, via network 105, an access request from a user, workflow, or system component, as well as attribute data associated with the access request. In various embodiments, a user may be a human user or an upstream software component. Policy decision point 210 generates a log entry for the access request and transmits the log entry to audit logs 240 for storage. In various embodiments, the log entry may include an identifier associated with the access request, an identifier associated with the requesting component, a workflow associated with the access request, or any attributes associated with the access request and provided by the requesting component.

Policy decision point 210 retrieves one or more access control policies from access control policies 220 based on the received access request. In various embodiments, policy decision point 210 may retrieve access control policies associated with a requesting user, a requesting system component, a workflow associated with the access request, an action engine designated to perform work in the computing system, or a resource to be accessed or modified in conjunction with the access request. In various embodiments, policy decision point 210 may only retrieve access control policies, and does not have permission to modify, add, or delete access control policies in access control policies 220.

Policy decision point 210 retrieves and/or calculates attribute values for attributes included in the one or more access control policies retrieved from access control policies 220. As described above, policy decision point 210 may receive one or more attribute values included in an access request. Policy decision point may also retrieve one or more attribute values from entity data store 230. Policy decision point 210 may also perform conditional logic or other calculations to derive or generate an attribute value. For example, an attribute included in an access control policy associated with an access request may specify that configuration of a particular network device must occur during an allowed maintenance time period specified for the network device. Policy decision point 210 may query entity data store 230 to retrieve one or more allowed maintenance time period attribute values specified for the particular network device and compare the retrieved maintenance time period attribute value with a current system time value or a timestamp associated with the received access request. Based on the comparison, policy decision point 210 determines a value for the access control policy attribute, e.g., whether the request to configure the particular network device was received during an allowed maintenance time period.

Policy decision point 210 retrieves, derives, or calculates attribute values for one or more attributes included in access control policies associated with the access request as described above. Policy decision point 210 also evaluates one or more rules included in the access control policies. In various embodiments, a rule may include a logical or conditional relationship between two or more attributes included in an access control policy. If policy decision point 210 determines that all attributes and rules included in the access control policies are satisfied, policy decision point 210 generates an access request approval and transmits the access request approval to the requesting user, component, or workflow via network 105. If policy decision point 210 determines that one or more attributes and/or rules included in the access control policies are not satisfied, policy decision point 210 generates an access request denial and transmits the access request denial to the requesting user, component, or workflow via network 105. In various embodiments, policy decision point 210 may terminate the evaluation of attributes and rules included in the access control policies, and generate an access request denial, upon a determination that any rule in an access control policy explicitly denies access to the requested resource. In various embodiments, policy decision point 210 may further ignore, deny, or otherwise restrict access requests from a particular user, system component, or workflow based on a threshold frequency or threshold quantity of previous access request denials associated with the user, system component, or workflow. The threshold frequency or threshold quantity may be predetermined, or may be based on a statistical analysis of historical access requests recorded in, e.g., audit logs 240. In addition to restricting access requests, policy decision point 210 may further record the restriction in audit logs 240 and/or generate an alert to a user.

In some embodiments, when policy decision point 210 generates and transmits an access request approval to a requesting action engine, policy decision point 210 may also generate and transmit an authorization token to the requesting action engine via network 105. The authorization token may specify that the token is valid for all actions performed by the action engine during a workflow associated with the access request. The authorization token permits the action engine to complete all tasks specified by the associated workflow based on the action engine's original permissions at the time the access request was submitted, even if the action engine's permissions change during execution of the workflow. Allowing the action engine to complete all workflow tasks despite changing permissions prevents a partially completed workflow from leaving one or more components of the distributed computing system in an inconsistent state.

In some embodiments, authorization service 110 may perform partial evaluation of an access request. In partial evaluation of an access request, one or more specified portions of an access request are held constant while authorization service 110 determines values for a different portion of the access request that would result in policy decision point 210 generating an access request approval. For example, if an access request specifies a configuration change to be applied to a particular network device, authorization service 110 may evaluate one or more users included in entity data store 230 via policy decision point 210. Authorization service 110 records a subset of users for whom policy decision point 210 generated an access request approval, e.g., the subset of users who would be authorized to cause the specified configuration change to be applied to the particular network device. A user may provide access requests for partial evaluation to authorization service 110 via GUI services 120. Authorization service 110 may also transmit the results of the partial evaluation to the user via GUI services 120.

FIG. 3 is a flow diagram of method steps for performing access control authorization, according to various embodiments. Although the method steps are described in conjunction with the systems of FIGS. 1-2 and 4, persons skilled in the art will understand that any system configured to perform the method steps in any order falls within the scope of the present disclosure.

As shown, in operation 300, policy decision point 210 receives an access request from a user, system component, or workflow via network 105. In various embodiments, policy decision point 210 may receive the access request from any user, system component, or workflow in a distributed, multi-domain computing system. The access request may include user, resource, action, and context data associated with the access request.

In operation 302, policy decision point 210 records the access request in audit logs 240. Policy decision point may also record data associated with the access request in audit logs 240, including users, components, resources, or workflows associated with the access request. In various embodiments, a user or software application may query audit logs 240 via GUI services 120 to generate audit log reports and view the generated reports via GUI services 120. The generated reports may include statistical and/or trend analysis on the data recorded in audit logs 240.

In operation 304, policy decision point 210 retrieves one or more access control policies associated with the access request from access control policies 220. In various embodiments, authorization service 110 may implement a "policies as code" method, wherein access control policies are stored as computer code including human-readable logical computational or logical expressions. An access control policy may include attributes or rules associated with a requesting user or component, a workflow associated with the access request, or one or more components associated with the access request.

In operation 306, policy decision point 210 retrieves attribute values for attributes included in the one or more access control policies from entity data store 230. Policy decision point 210 may also calculate and/or derive attribute values for attributes included in the one or more access control policies via conditional logic. For example, a user may create an item of data to be consumed by workflows, and then restrict access to that data to a group for which the user is a member. A workflow maintainer may also grant access to a workflow to other users; however, those users must also have access to the underlying authorizations required by the workflow in addition to having relationship-based access (i.e. being a member of the group allowed to access the workflow).

In operation 308, policy decision point 210 evaluates the access request based on the retrieved access control policies, the data associated with the access request, and the retrieved or calculated values for the attributes included in the access control policies. If policy decision point 210 determines that all attributes and rules included in the retrieved access control policies are satisfied, policy decision point 210 generates an access request approval. If policy decision point 210 determines that one or more attributes and/or rules included in the retrieved access control policies are not satisfied, policy decision point 210 generates an access request denial.

In operation 310, policy decision point 210 transmits the access request evaluation (e.g., an access request approval or an access request denial) to the requesting user, system component, or workflow of workflow orchestration platform 150 via API 200 and network 105. As discussed above in reference to FIG. 2, policy decision point 210 may also generate and transmit an authorization token to the requesting action engine via API 200 and network 105. The authorization token may specify that the token is valid for all actions performed by the action engine during a workflow associated with the access request. Policy decision point 210 may further ignore, deny, or otherwise restrict access requests from a particular user, system component, or workflow based on a threshold frequency or threshold quantity of previous access request denials associated with the user, system component, or workflow.

Figure 4:
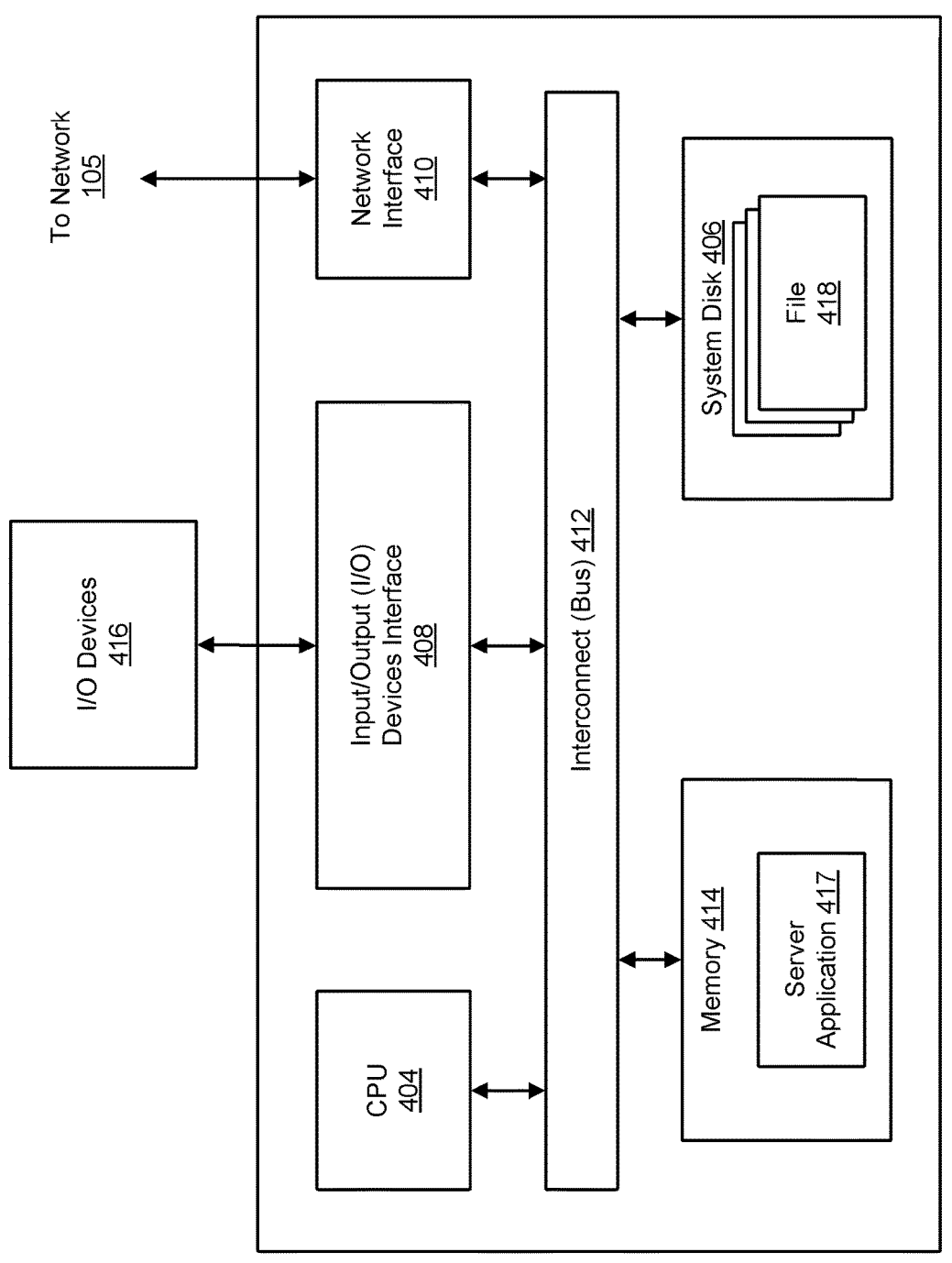
FIG. 4 illustrates a computer system configured to implement one or more aspects of various embodiments.

FIG. 4 illustrates a computer system configured to implement one or more aspects of various embodiments. As shown, the computer system includes, without limitation, a central processing unit (CPU) 404, a system disk 406, an input/output (I/O) devices interface 408, a network interface 410, an interconnect 412, and a system memory 414.

CPU 404 is configured to retrieve and execute programming instructions, such as a server application 417, stored in system memory 414. Similarly, CPU 404 is configured to store application data (e.g., software libraries) and retrieve application data from system memory 414. Interconnect 412 is configured to facilitate transmission of data, such as programming instructions and application data, between CPU 404, system disk 406, I/O devices interface 408, network interface 410, and system memory 414. I/O devices interface 408 is configured to receive input data from I/O devices 416 and transmit the input data to CPU 404 via interconnect 412. For example, I/O devices 416 may include one or more buttons, a keyboard, a mouse, and/or other input devices. I/O devices interface 408 is further configured to receive output data from CPU 404 via interconnect 412 and transmit the output data to I/O devices 416.

System disk 406 may include one or more hard disk drives, solid state storage devices, or similar storage devices. System disk 406 is configured to store non-volatile data such as files 418 (e.g., application files, software libraries, etc.). Files 418 can then be retrieved by one or more endpoint devices 140 via network 105. In some embodiments, network interface 410 is configured to operate in compliance with the Ethernet standard.

System memory 414 includes server application 417, which is configured to service requests received from an endpoint device 140 for one or more files 418. When server application 417 receives a request for a given file 418, server application 417 retrieves the requested file 418 from system disk 406 and transmits file 418 to an endpoint device 140 via network 105. In alternative embodiments, some or all of files 418 may instead be stored in a data store 130, or in any other technically feasible location within infrastructure 100.

In sum, an authorization service receives, tracks and evaluates access requests for automated information technology (IT) workflows that are executed across disparate hardware resources and software applications in a distributed computing system. In operation, the authorization service receives an access request from a user or component in the distributed computing system. The access request includes data associated with the requester, requested workflow, and necessary resources to execute the workflow. The authorization service records all access requests to an audit log using structured logging so that individual fields can be filtered, sorted, and correlated. This audit log is used for all access requests in the entire distributed system, facilitating the analysis of access requests across discrete domains. The authorization service may also receive externally generated user authorization tokens via an application programming interface (API).

The authorization service retrieves access control policies stored as computer code in a centralized policy repository. The access control policies specify attributes associated with a requester, resources, context, or workflow action that must be met for an access request to be approved. The authorization service retrieves attribute data from a system-wide entity data store. Based on the access request, access control policies, and attribute data, the authorization service approves or denies the access request and transmits the approval or denial to the requesting user or system component. The authorization service may also grant action engines (components within the distributed computing system that perform work) one-time or job-specific access tokens that authorize the action engine to retrieve information or perform some unit of work based on the original permissions which the requestor had when submitting an access request. A one-time or job-specific access token allows an action engine to complete one or more workflows as intended at the time of submission even if permissions change during execution, preventing workflows from leaving work in an inconsistent state.

The authorization service may perform partial evaluation of an access request, where some aspects of the access request are held constant while the authorization service determines values for other aspects of the access request that would result in approval of the access request. For example, for a given resource, action, and context in an access request, the authorization service may determine a subset of users for whom the access request would be approved. As another example, the authorization service may determine a set of allowable workflow actions given a particular user, resource, and context. The authorization service may display the results of partial evaluations so that a user may validate access control policies. The authorization service may also store the results of partial evaluations for later analysis.

One technical advantage of the disclosed techniques relative to the prior art is that the techniques provide distributed enforcement of granular access control at the domain, component, or application level in a multi-domain computing system while maintaining centralized control over access control policies and authorization decisions. The techniques also provide centralized auditing and logging services, as well as a data store of attributes associated with users, actions, resources, and contexts. These technical advantages provide one or more technological improvements over prior art approaches.

1. In some embodiments, a computer-implemented method for performing authorization flow comprises receiving an access request from a requesting entity in a distributed computing system, retrieving one or more access control policies associated with the access request, retrieving, from an entity data store, attribute values for one or more attributes included in the one or more access control policies, generating, based on the attribute values and the one or more access control policies, an access request evaluation, and transmitting the access request evaluation to the requesting entity.

2. The computer-implemented method of clause 1, wherein the requesting entity is one of a human user, a computing system component, or a workflow.

3. The computer-implemented method of clauses 1 or 2, wherein the access request includes contextual attribute data associated with the requesting entity, a resource, or an action.

4. The computer-implemented method of any of clauses 1-3, wherein the access request evaluation is an access request approval, the computer-implemented method further comprising generating an authorization token associated with the access request approval, and transmitting the authorization token to the requesting entity.

5. The computer-implemented method of any of clauses 1-4, further comprising storing the access request in an audit log.

6. The computer-implemented method of any of clauses 1-5, wherein the method further comprises determining a plurality of users included in the entity data store, generating, for each user in the plurality of users, an associated access request evaluation based on the access request and the user, generating a subset of the plurality of users for which the access request evaluation associated with the user is an access request approval, and displaying, via a graphical user interface, the subset of the plurality of users.

7. The computer-implemented method of any of clauses 1-6, wherein the method further comprises receiving, via an application programming interface, an identity token associated with the requesting entity.

8. In some embodiments, one or more non-transitory computer-readable media store instructions that, when executed by one or more processors, cause the one or more processors to perform the steps of receiving an access request from a requesting entity in a distributed computing system, retrieving one or more access control policies associated with the access request, retrieving, from an entity data store, attribute values for one or more attributes included in the one or more access control policies, generating, based on the attribute values and the one or more access control policies, an access request evaluation, and transmitting the access request evaluation to the requesting entity.

9. The one or more non-transitory computer-readable media of clause 8, wherein the requesting entity is one of a human user, a computing system component, or a workflow.

10. The one or more non-transitory computer-readable media of clauses 8 or 9, wherein the access request includes contextual attribute data associated with the requesting entity, a resource, or an action.

11. The one or more non-transitory computer-readable media of any of clauses 8-10, wherein the access request evaluation is an access request approval, the computer-implemented method further comprising generating an authorization token associated with the access request approval, and transmitting the authorization token to the requesting entity.

12. The one or more non-transitory computer-readable media of any of clauses 8-11, wherein the instructions further cause the one or more processors to perform the step of storing the access request in an audit log.

13. The one or more non-transitory computer-readable media of any of clauses 8-12, wherein the instructions further cause the one or more processors to perform the steps of determining a plurality of users included in the entity data store, generating, for each user in the plurality of users, an associated access request evaluation based on the access request and the user, generating a subset of the plurality of users for which the access request evaluation associated with the user is an access request approval, and displaying, via a graphical user interface, the subset of the plurality of users.

14. The one or more non-transitory computer-readable media of any of clauses 8-13, wherein the instructions further cause the one or more processors to perform the step of receiving, via an application programming interface, an identity token associated with the requesting entity.

15. In some embodiments, a system comprises one or more memories storing instructions, and one or more processors for executing the instructions to receive an access request from a requesting entity in a distributed computing system, retrieve one or more access control policies associated with the access request, retrieve, from an entity data store, attribute values for one or more attributes included in the one or more access control policies, generate, based on the attribute values and the one or more access control policies, an access request evaluation, and transmit the access request evaluation to the requesting entity.

16. The system of clause 15, wherein the requesting entity is one of a human user, a computing system component, or a workflow.

17. The system of clauses 15 or 16, wherein the access request includes contextual attribute data associated with the requesting entity, a resource, or an action.

18. The system of any of clauses 15-17, wherein the access request evaluation is an access request approval and the one or more processors are further configured to generate an authorization token associated with the access request approval, and transmit the authorization token to the requesting entity.

19. The system of any of clauses 15-18, wherein the one or more processors are further configured to store the access request in an audit log.

20. The system of any of clauses 15-19, wherein the one or more processors are further configured to determine a plurality of users included in the entity data store, generate, for each user in the plurality of users, an associated access request evaluation based on the access request and the user, generate a subset of the plurality of users for which the access request evaluation associated with the user is an access request approval, and display, via a graphical user interface, the subset of the plurality of users.

Any and all combinations of any of the claim elements recited in any of the claims and/or any elements described in this application, in any fashion, fall within the contemplated scope of the present invention and protection.

The descriptions of the various embodiments have been presented for purposes of illustration but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "module," a "system," or a "computer." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semi-conductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine. The instructions, when executed via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for performing authorization flow, the computer-implemented method comprising:

receiving an access request from a requesting entity in a distributed computing system, wherein the access request specifies an automated workflow and includes first attribute values associated with one or more executable commands included in the automated workflow;

retrieving one or more access control policies associated with the access request;

retrieving, from an entity data store, second attribute values for one or more attributes included in the one or more access control policies;

generating, based on the first and second attribute values and the one or more access control policies, an access request evaluation; and transmitting the access request evaluation to the requesting entity.

2. The computer-implemented method of claim 1, wherein the automated workflow is a first automated workflow, and the requesting entity is one of a human user, a computing system component, or a second automated workflow.

3. The computer-implemented method of claim 1, wherein the access request includes contextual attribute data associated with the requesting entity, a resource, or an action.

4. The computer-implemented method of claim 1, wherein the access request evaluation is an access request approval, the computer-implemented method further comprising:

generating an authorization token associated with the access request approval; and transmitting the authorization token to the requesting entity.

5. The computer-implemented method of claim 1, further comprising storing the access request in an audit log.

6. The computer-implemented method of claim 1, wherein the computer-implemented method further comprises:

determining a plurality of users included in the entity data store;

generating, for each user in the plurality of users, an associated access request evaluation based on the access request and the user;

generating a subset of the plurality of users for which the access request evaluation associated with the user is an access request approval; and displaying, via a graphical user interface, the subset of the plurality of users.

7. The computer-implemented method of claim 1, wherein the computer-implemented method further comprises receiving, via an application programming interface, an identity token associated with the requesting entity.

8. One or more non-transitory computer-readable media storing instructions that, when executed by one or more processors, cause the one or more processors to perform the steps of:

receiving an access request from a requesting entity in a distributed computing system, wherein the access request specifies an automated workflow and includes first attribute values associated with one or more executable commands included in the automated workflow;

retrieving one or more access control policies associated with the access request;

retrieving, from an entity data store, second attribute values for one or more attributes included in the one or more access control policies;

generating, based on the first and second attribute values and the one or more access control policies, an access request evaluation; and transmitting the access request evaluation to the requesting entity.

9. The one or more non-transitory computer-readable media of claim 8, wherein the automated workflow is a first automated workflow, and the requesting entity is one of a human user, a computing system component, or a second automated workflow.

10. The one or more non-transitory computer-readable media of claim 8, wherein the access request includes contextual attribute data associated with the requesting entity, a resource, or an action.

11. The one or more non-transitory computer-readable media of claim 8, wherein the access request evaluation is an access request approval, the computer-implemented method further comprising:

generating an authorization token associated with the access request approval; and transmitting the authorization token to the requesting entity.

12. The one or more non-transitory computer-readable media of claim 8, wherein the instructions further cause the one or more processors to perform the step of storing the access request in an audit log.

13. The one or more non-transitory computer-readable media of claim 8, wherein the instructions further cause the one or more processors to perform the steps of:

determining a plurality of users included in the entity data store;

generating, for each user in the plurality of users, an associated access request evaluation based on the access request and the user;

generating a subset of the plurality of users for which the access request evaluation associated with the user is an access request approval; and displaying, via a graphical user interface, the subset of the plurality of users.

14. The one or more non-transitory computer-readable media of claim 8, wherein the instructions further cause the one or more processors to perform the step of receiving, via an application programming interface, an identity token associated with the requesting entity.

15. A system comprising:

one or more memories storing instructions; and one or more processors for executing the instructions to:

receive an access request from a requesting entity in a distributed computing system, wherein the access request specifies an automated workflow and includes first attribute values associated with one or more executable commands included in the automated workflow;

retrieve one or more access control policies associated with the access request;

retrieve, from an entity data store, second attribute values for one or more attributes included in the one or more access control policies;

generate, based on the first and second attribute values and the one or more access control policies, an access request evaluation; and transmitting the access request evaluation to the requesting entity.

16. The system of claim 15, wherein the automated workflow is a first automated workflow, and the requesting entity is one of a human user, a computing system component, or a second automated workflow.

17. The system of claim 15, wherein the access request includes contextual attribute data associated with the requesting entity, a resource, or an action.

18. The system of claim 15, wherein the access request evaluation is an access request approval and the one or more processors are further configured to:

generate an authorization token associated with the access request approval; and transmit the authorization token to the requesting entity.

19. The system of claim 15, wherein the one or more processors are further configured to store the access request in an audit log.

20. The system of claim 15, wherein the one or more processors are further configured to:

determine a plurality of users included in the entity data store;

generate, for each user in the plurality of users, an associated access request evaluation based on the access request and the user;

generate a subset of the plurality of users for which the access request evaluation associated with the user is an access request approval; and display, via a graphical user interface, the subset of the plurality of users.

* * * * *